Patented July 10, 1951

2,560,051

UNITED STATES PATENT OFFICE 2,560,051

FRICTION MATERIAL LUBRICANT

Roy W. Brown, Akron, Ohio, assignor to The Firestone Tire & Rubber Company, Akron, Ohio, a corporation of Ohio No Drawing. Original application October 14, 1942, Serial No. 462,060, now Patent No. 2,537,629, dated January 9, 1951. Divided and this application April 8, 1949, Serial No. 86,377

4 Claims. (Cl. 252—22)

This invention relates to improved lubricants for friction devices and friction material. This application is a division of my copending application Serial No. 462,060, filed October 14, 1942, now Patent No. 2,537,629 dated January 9, 1951.

It is an object to provide a lubricating composition, especially suited for use in a friction material, which lubricant is substantially unaffected by contact with water or ordinary oils and greases.

Another object is to provide a lubricating composition which is substantially solid at atmospheric temperatures but which, at higher temperatures that may occur in a friction device incorporating the composition, melts to a viscous liquid that tends to stay in and on the material lubricated by the composition.

The invention relates to an improved, solid, thixotropic lubricant for incorporation in a friction material, preferably of the type possessing a coefficient of kinetic or dynamic friction greater than its coefficient of static friction. Such friction material comprises a porous, flexible layer, such as textile fabric, preferably backed by an insulating layer of a resilient, elastic substance, such as rubber or synthetic rubber. The exposed surface of the porous layer, opposite the resilient, elastic backing, provides the bearing surface of the friction material, and this bearing surface is impregnated with the lubricant of the invention.

It is the function of the friction material lubricant to prolong the lift of the material and of a friction device embodying the same, and to impart smoother operation to the device without destroying the novel friction characteristics thereof. It is also desirable that the lubricant shall have no appreciably deleterious effect on the rubber or rubber-like portion of the friction material, and that the lubricant shall not promote any corrosion of the metal part or parts of a friction device but shall actually protect the same from corrosion. To these ends the novel lubricant comprises a basic ingredient which is an efficient lubricant, which does not swell or otherwise deleteriously affect vulcanized rubber or synthetic rubber, and which contains no appreciable quantity of a substance that may promote the corrosion of metal used in bearing or housing parts of a friction device.

The lubricant of the invention consists essentially of castor oil and a waxy lubricant, together with a small proportion of an aluminum soap of castor oil fatty acids. The preferred proportions of the ingredients in parts by weight, are as follows:

Castor oil _____ 29 to 46
A waxy lubricant of the group consisting of hydrogenated castor oil, beeswax and lanolin _____ 48 to 64
The aluminum soap _____ 2 to 3

A raw castor oil selected to contain a low fat acid content has been found to possess the qualities desired for the basic ingredient of the lubricant. This preferred castor oil is of a quality equal to a castor oil suitable for medicinal uses. A part or all of the castor oil of the lubricant may be replaced by derivatives of castor oil. For example, the viscosity and pour point of the lubricant may be lowered by utilizing acetylated castor oil. Also, the viscosity of the lubricant may be increased by employing hydrogenated castor oil in the lubricant. Other lubricating substances, besides castor oil derivatives, may be added to the lubricant, such as flake or colloidal graphite, various waxes, and modifiers and other special materials which specifically improve the properties of the lubricant.

Example 1

An example of a suitable solid lubricant possesses the following composition:

| | Per cent by weight |
|---|---|
| Beeswax | 24 |
| Lanolin | 24.5 |
| Castor oil | 20 |
| Flake graphite | 0.5 |
| 10% colloidal graphite--90% castor oil | 25 |
| Aluminum soap of castor oil fatty acids | 6 |

The novel lubricant posses thixotropic properties, whereby it acts as a solid at ordinary atmospheric temperatures and under low stress conditions but acts as a liquid at localized regions in a bearing when relatively high stresses are brought to bear upon it. Thus, the lubricant does not liquify to the point of flowing out of the joint or friction material but only to the extent of providing good lubrication to the bearing. The lubricant possesses this desirable lubricating characteristic even at very low temperatures. The waxy ingredients, beeswax and lanolin, of the lubricant are compatible with the other ingredients thereof and are water insoluble.

The colloidal graphite preparation is commercially available as a 10 per cent colloidal suspension of graphite in raw castor oil of the quality indicated above. The colloidal graphite functions in a friction device to penetrate to all portions thereof accessible to the lubricant containing the graphite and to aid the castor oil in efficiently lubricating all moving surfaces contacting the bearing surface of the friction material impregnated with the lubricant. The flake graphite fills the pores in the bearing surface of the friction material to provide a more uniform bearing surface thereof and to aid in lubricating said surface.

The aluminum soap of castor oil fatty acids is compatible with the other ingredients of the lubricant and is insoluble in water. The soap improves the lubricating film strength of the lubricant and prevents it from losing its high lubricating efficiency at very low temperatures, by tending to inhibit the hysteresis of viscosity of the castor oil or castor oil derivative present in the lubricant. The soap also increases the viscosity of waxes, such as beeswax and lanolin, at temperatures above their melting points, whereby the lubricant does not tend to flow from a bearing utilizing the same when the bearing temperatures are high.

The above solid lubricant may suitably be liquified by heating to 200–225° F. for impregnating friction material.

*Example 2*

Another example of a solid lubricant and one that is preferred for general usage in friction material, possesses approximately the following composition:

| | Per cent by weight |
|---|---|
| Calcium dichlorostearate | 1.0 |
| Flake graphite | 0.5 |
| 10% colloidal graphite—90% castor oil | 30.3 |
| Aluminum soap of castor oil fatty acids | 4.0 |
| Hydrogenated castor oil | 63.7 |
| Oxidized and polymerized castor oil | 0.5 |

The flake graphite, colloidal graphite-castor oil and aluminum soap of castor oil fatty acids have already been described in connection with the preceding example. The hydrogenated castor oil is a hard, waxy material, compatible with the other ingredients of the lubricant and unaffected by water or petroleum products. This waxy substance makes the lubricant substantially solid at ordinary atmospheric temperatures and is an effective lubricant.

The calcium dichlorostearate is a special additive or modifier functioning to improve the lubricating film strength of the lubricant, to increase the viscosity of the same at high temperatures and substantially to inhibit the hysteresis of viscosity of the lubricant at low temperatures. This calcium compound cooperates with the special aluminum soap to impart modified properties to the lubricant in addition to the properties expected by the addition of each modifier singly. In other words, these two modifiers produce more than an additive effect when combined in the lubricant.

The oxidized and polymerized castor oil is a viscous material, which may be sticky and have a spongy structure. It may be prepared by heating and blowing castor oil. This modified castor oil is very effective in controlling the friction characteristics of the lubricant, since a very small proportion of it in the lubricant imparts increased friction properties thereto. This lubricant additive also tends to increase the ratio of the static friction/dynamic friction of the lubricant, whereby it is possible to prepare a lubricant having better balanced frictional properties throughout a wide temperature range. Thus, for instance, the lubricant in this example, by reason of the presence of the modified castor oil therein, possesses substantially the same desirable frictional characteristics at temperatures below 0° F. as it possesses at higher and more normal atmospheric temperatures.

The lubricant of this example is insoluble in water, petroleum products and vulcanized rubber. It is a hard wax at room temperatures, softens appreciably around 140° F. and is thixotropic. Beyond its melting point of approximately 186° F. it is liquid, having excellent film strength and wetting properties. This combination of properties prevents wastage of lubricant by flow from the bearings or from mechanical abrasion incidental to immersion in water and dirt, and when loaded dynamically it provides adequate lubrication. Actual tests have indicated that the coefficient of friction of a friction device lubricated with this lubricant decreases at temperatures below 32° F. Thus, for example, a vehicle employing the preferred type of lubricant in steering link joints is more easily steered in cold weather than in temperate weather. The lubricant, by reason of its physical properties enumerated above, will normally remain in friction material impregnated therewith for the useful life of the friction device embodying the friction material.

*Example 3*

Another example of a preferred solid lubricant, which is similar to the lubricant of Example 2 except that it contains no graphite, is a composition having the following formula:

| | Per cent by weight |
|---|---|
| Calcium dichlorostearate | 1.0 |
| Castor oil | 31.0 |
| Aluminum soap of castor oil fatty acids | 4.0 |
| Hydrogenated castor oil | 63.5 |
| Oxidized and polymerized castor oil | 0.5 |

This lubricant is a thixotropic, waxy material having substantially those properties set out with respect to Example 3. It is especially suited for use in bearings in which graphite is considered objectionable. It is also light in color, as compared with graphite-containing lubricants, and this property may sometimes be an advantage in certain applications of the lubricant.

*Impregnating friction material*

A preferred method of impregnating friction material with the lubricant will now be briefly described. This method gives uniformly satisfactory impregnation with any of the specific types of lubricants disclosed above.

The friction material, to which the rubber or rubber-like layer is vulcanized or cured, is carefully protected from coming into contact with water, steam or petroleum products, especially oils and greases. The material is actually impregnated in the liquified lubricant contained in a steam heated kettle designed to maintain the temperature within a definite range to insure uniform impregnations; a temperature of 200–220° F. has been found satisfactory for lubricants similar to those disclosed in the examples. The kettle is preferably provided with means to maintain a constant liquid level above the parts being impregnated and means for circulating the liquified lubricant over around the said parts. The parts are preferably suspended in the lubricant in the kettle by means of a centrifuge basket, within which the parts are positioned. An impregnation time of approximately 15 minutes has been found to be satisfactory for a variety of differently constructed parts, but a variation in this figure may be desirable for specific lubricants or friction materials.

The completely impregnated parts are then cleared of excess lubricant by removing the basket containing the parts from the kettle and immediately centrifuging them for a short period of time, suitably a minute or two. The impregnated friction material parts are then ready for assembling in the friction devices for which they have been designed.

The preferred novel lubricant possesses such friction characteristics that it may impart to a friction material a coefficient of kinetic friction greater than its coefficient of static friction, even though the friction material does not comprise a resilient, elastic backing layer. For example, friction material consisting of a layer of textile fabric or porous metal, directly backed by a rigid casing or housing of a friction device, shows, when impregnated with a preferred lubricant, e. g. the lubricant of Example 2, a coefficient of kinetic friction which is greater than its coefficient of static friction.

A friction material comprising a layer of woven cotton fabric adhered to a backing layer of vulcanized rubber was impregnated with a lubricant similar to the lubricant of Example 1. The impregnated material was found to possess a ratio of kinetic/static friction of approximately 3/1.

It is to be understood that the specific examples of the friction material lubricant described in detail herein are merely illustrative of the invention and are in no way limiting of the broad aspects thereof. Variations in the specific nature and proportions of the ingredients of the lubricant are included within the scope of the invention, as will be apparent to those skilled in the art, who may make such variations in order to attain desired specific results.

What is claimed is:

1. A thixotropic friction material lubricant substantially composed of the following ingredients, in parts by weight:

| | |
|---|---|
| Castor oil | 29.3 |
| Hydrogenated castor oil | 63.7 |
| Flake graphite | 0.5 |
| Colloidal graphite | 3 |
| Aluminum soap of castor oil fatty acids | 2 |
| Calcium dichlorostearate | 1 |
| Oxidized and polymerized castor oil | 0.5 |

2. A thixotropic friction material lubricant substantially composed of the following ingredients, in parts by weight:

| | |
|---|---|
| Castor oil | 33 |
| Hydrogenated castor oil | 63.5 |
| Aluminum soap of castor oil fatty acids | 2 |
| Calcium dichlorostearate | 1 |
| Oxidized and polymerized castor oil | 0.5 |

3. A thixotropic friction material lubricant substantially composed of the following ingredients, in parts by weight:

| | |
|---|---|
| Beeswax | 24 |
| Lanolin | 24.5 |
| Castor oil | 45.5 |
| Flake graphite | 0.5 |
| Colloidal graphite | 2.5 |
| Aluminum soap of castor oil fatty acids | 3 |

4. A thixotropic lubricating composition substantially composed of the following ingredients, in parts by weight:

| | |
|---|---|
| Castor oil | 29 to 46 |
| A waxy lubricant of the group consisting of hydrogenated castor oil, beeswax and lanolin | 48 to 64 |
| Aluminum soap of castor oil fatty acids | 2 to 3 |

ROY W. BROWN.

REFERENCES CITED

The following references are of record in the file of this patent:

UNITED STATES PATENTS

| Number | Name | Date |
|---|---|---|
| 335,546 | Thompson | Feb. 2, 1886 |
| 1,617,077 | Nill et al. | Feb. 8, 1927 |
| 1,881,591 | Horwitz | Oct. 11, 1932 |
| 2,027,389 | Lazier | Jan. 14, 1936 |
| 2,201,217 | Ballard | May 21, 1936 |
| 2,321,384 | Hemker | June 8, 1943 |

FOREIGN PATENTS

| Number | Country | Date |
|---|---|---|
| 326,359 | Great Britain | Mar. 13, 1930 |